(12) United States Patent
Zhang et al.

(10) Patent No.: US 10,254,471 B2
(45) Date of Patent: Apr. 9, 2019

(54) LIGHT GUIDE PLATE AND MANUFACTURING METHOD THEREOF, BACKLIGHT MODULE, AND DISPLAY APPARATUS

(71) Applicants: BOE Technology Group Co., Ltd., Beijing (CN); Hefei BOE Display Light Co., Ltd., Anhui (CN)

(72) Inventors: Xiaochu Zhang, Beijing (CN); Yaling Kang, Beijing (CN); Zuchuan Shi, Beijing (CN)

(73) Assignees: BOE TECHNOLOGY GROUP CO., LTD., Beijing (CN); HEFEI BOE DISPLAY LIGHTING CO., LTD., Anhui (CN)

( * ) Notice: Subject to any disclaimer, the term of this patent is extended or adjusted under 35 U.S.C. 154(b) by 237 days.

(21) Appl. No.: 15/232,875

(22) Filed: Aug. 10, 2016

(65) Prior Publication Data

US 2017/0192161 A1 Jul. 6, 2017

(30) Foreign Application Priority Data

Jan. 4, 2016 (CN) .......................... 2016 1 0008877

(51) Int. Cl.
*F21V 8/00* (2006.01)

(52) U.S. Cl.
CPC ......... *G02B 6/0088* (2013.01); *G02B 6/0021* (2013.01); *G02B 6/0036* (2013.01); *G02B 6/0053* (2013.01); *G02B 6/0065* (2013.01)

(58) Field of Classification Search
CPC .. G02B 6/0088; G02B 6/0021; G02B 6/0036; G02B 6/0053; G02B 6/0065; G02B 6/0096; G02B 6/0086; G02B 6/0033; G02B 6/0011; F21V 2200/40; F21V 2200/20

See application file for complete search history.

(56) References Cited

U.S. PATENT DOCUMENTS

| 9,618,674 | B2 | 4/2017 | Kim et al. | |
|---|---|---|---|---|
| 2003/0008668 | A1* | 1/2003 | Perez-Breva | G01S 5/0252 455/456.1 |
| 2005/0088838 | A1* | 4/2005 | Tsai | G02B 6/0036 362/615 |
| 2008/0049441 | A1* | 2/2008 | Lee | G02B 6/0096 362/561 |

(Continued)

FOREIGN PATENT DOCUMENTS

| CN | 1612018 A | 5/2005 |
|---|---|---|
| CN | 102865508 A | 1/2013 |

(Continued)

OTHER PUBLICATIONS

First Office Action, including Search Report, for Chinese Patent Application No. 201610008877.4, dated Jan. 10, 2018, 14 pages.

*Primary Examiner* — Bao Q Truong (74) *Attorney, Agent, or Firm* — Westman, Champlin & Koehler, P.A.

(57) ABSTRACT

Embodiments of the present invention provide a light guide plate for a backlight module. The light guide plate includes: a body comprising: a first surface; a second surface which is opposite to the first surface and serves as a light output surface; and a side face; and a groove formed inside the body and having an opening located in the side face. The groove is configured to accommodate an optical film.

20 Claims, 8 Drawing Sheets

(56) References Cited

U.S. PATENT DOCUMENTS

| | | | | |
|---|---|---|---|---|
| 2014/0204607 A1* | 7/2014 | Yan | ................ | G02B 6/0031 |
| | | | | 362/606 |
| 2015/0003113 A1* | 1/2015 | Doo | ................ | G02B 6/0021 |
| | | | | 362/615 |
| 2016/0154174 A1* | 6/2016 | Zhou | ................ | G02B 6/0096 |
| | | | | 362/606 |
| 2017/0139103 A1 | 5/2017 | Zhang | | |

FOREIGN PATENT DOCUMENTS

| | | |
|---|---|---|
| CN | 103676318 A | 3/2014 |
| CN | 104880759 A | 9/2015 |
| EP | 2 853 807 A2 | 4/2015 |

\* cited by examiner

LIGHT GUIDE PLATE AND MANUFACTURING METHOD THEREOF, BACKLIGHT MODULE, AND DISPLAY APPARATUS

CROSS-REFERENCE TO RELATED APPLICATION

This application claims the benefit of Chinese Patent Application No. 201610008877.4 filed on Jan. 4, 2016 in the State Intellectual Property Office of China, the whole disclosure of which is incorporated herein by reference.

BACKGROUND

1. Technical Field

Embodiments of the present invention relate to the field of display panel, and particularly to a light guide plate, a method of manufacturing the light guide plate, a backlight module and a display apparatus.

2. Description of the Related Art

A backlight module is a light source located at a back side of a liquid crystal display and is one of key components for a display panel of the liquid crystal display. A function of the backlight module is to supply a source of light having a sufficient luminance and uniformly distributed, so that the liquid crystal display can normally display pictures. A lighting effect of the backlight module will affect a visual effect of a liquid crystal display module directly. However, a light guide plate is an important element of the backlight module. At present, in a conventional backlight module, generally, films such as a diffusion film, a brightness enhancement film and a protection film are assembled to a light output surface of the light guide plate. However, these films are often displaced during assembling or sequent transportation of a product, resulting in quality abnormity such as fracture of a liquid crystal panel.

In summary, these films such as the diffusion film, the brightness enhancement film and the protection film are assembled to the light output surface of the conventional light guide plate, but these films are easily displaced during assembling or sequent transportation of a product, resulting in the quality abnormity such as the fracture of the liquid crystal panel.

SUMMARY

Embodiments of the present invention provide a light guide plate for backlight module, comprising: a body comprising: a first surface; a second surface which is opposite to the first surface and serves as a light output surface; and a side face; and a groove formed inside the body and having an opening located in the side face, wherein the groove is configured to accommodate an optical film.

Embodiments of the present invention further provide a backlight module comprising the abovementioned light guide plate.

Embodiments of the present invention further provide a display apparatus comprising the abovementioned backlight module.

Embodiments of the present invention also provide a method of manufacturing the abovementioned light guide plate comprising: forming the groove inside the body, wherein the groove is configured to accommodate an optical film and has the opening located in the side face.

LIST OF REFERENCE SIGNS

10: light guide plate, 101: first surface, 102: second surface, 103: groove,

104: side face of light guide plate, 1031: first inner surface of the groove close to second surface, 1032: second inner surface of the groove close to first surface, 1033: opening of the groove, 1034: edge of the groove close to side face of the light guide plate, 105: lamp recess, 1051: first surface of the lamp recess, 1052: opening of the lamp recess,

201: frame, 2011: inner edge of the frame, 2012: outer edge of the frame, a: distance from the groove to second surface of the light guide plate, b: distance from the groove to first surface of the light guide plate, c1, c2, c3: distances between side faces of the light guide plate and edges of the groove close to side faces of the light guide plate, d: preset distance, w1, w2, w3, w4: widths of borders of the frame,

501: first mold, 502: second mold, 5021: steel plate, 601: light guide plate to be cut,

602: cutting tool, 6021: tool bit, 6022: vacuum cleaner, 603: clamping fixture for fixing the light guide plate.

DETAILED DESCRIPTION OF THE EMBODIMENTS

A further description of the invention will be made in detail as below with reference to embodiments of the present invention taken in conjunction with the accompanying drawings. The following embodiments are intended to explain the present invention and the present invention should not be construed as being limited to the embodiment set forth herein.

Figure 1A:
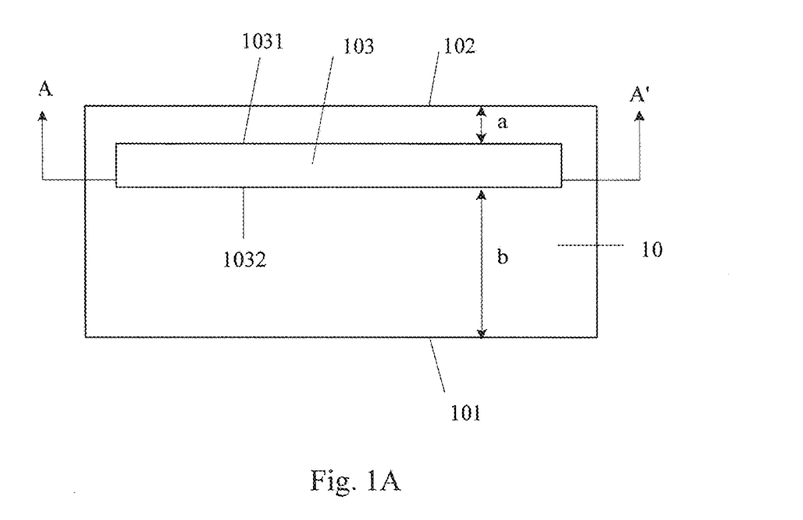
FIG. 1A is a schematic side view showing a structure of a light guide plate for a backlight module according to an embodiment of the present invention.

Embodiments of the present invention provide a light guide plate for a backlight module. FIG. 1A is a schematic side view showing a structure of a light guide plate for a backlight module according to the embodiment of the present invention. As shown in FIG. 1A, the light guide plate 10 comprises: a body comprising a first surface 101; a second surface 102 which is opposite to the first surface 101 and serves as a light output surface; and a side face 104; and a groove 103 formed inside the body and having an opening located in the side face. The groove 103 is configured to accommodate an optical film. The first surface 101 may be a light diffusion surface. For example, the first surface 101 has a concavo-convex microstructure (for example, a microstructural dot pattern) formed on the first surface 101, so as to be formed into the light diffusion surface.

In some implementations, FIG. 1A is the schematic view showing a structure of the side face of the light guide plate where the opening of the groove is located, when viewed from a side of the light guide plate in the direction of the opening of the groove. As shown in FIG. 1A, the light guide plate 10 for a backlight module comprises the first surface 101, the second surface 102, and the groove 103. In the embodiment, the groove 103 is formed inside the body of the light guide plate 10, the groove 103 is configured to accommodate the optical film included in the backlight module, and the opening of the groove is located in the side face of the light guide plate.

Figure 1B:
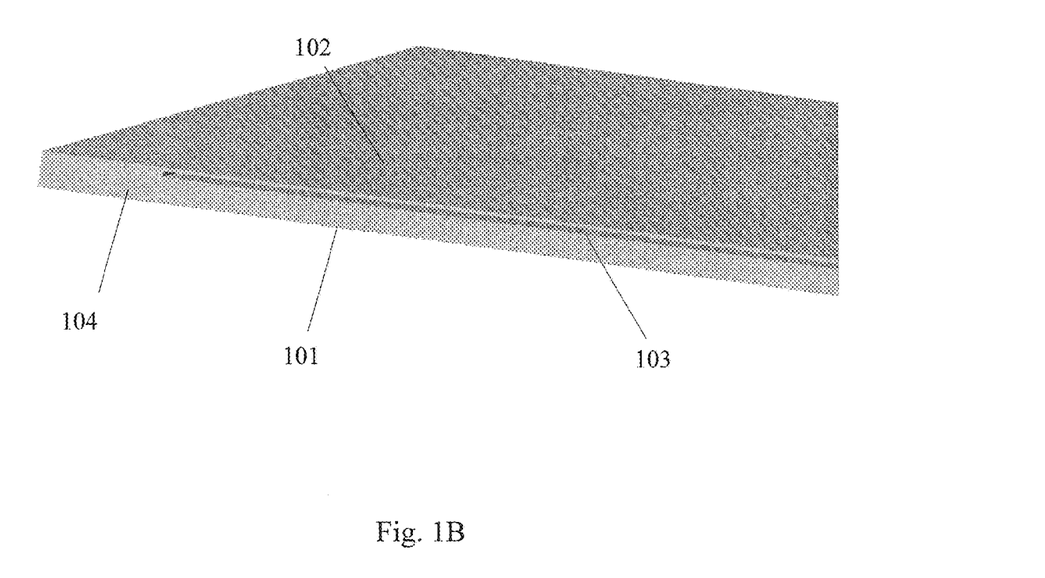
FIG. 1B is a perspective view of the light guide plate for backlight module according to the embodiment of the present invention.

FIG. 1B is a perspective view of the light guide plate for a backlight module according to the embodiment of the present invention. As shown in FIG. 1B, a rectangular body of the light guide plate is shown. In FIG. 1B, the reference numeral 102 denotes the second surface (i.e., light output surface or upper surface) of the light guide plate, while a surface opposite to the second surface is the first surface 101 (i.e., lower surface or bottom surface of the light guide plate, not shown). The opening of the groove is located in the side face 104 (i.e., a narrower surface of the rectangular body), while the groove 103 is formed inside the body of the light guide plate. In other words, the groove is a hollow cavity construction, i.e., a cavity extending from the opening of the groove towards an inside of the body of the light guide plate.

Generally, films such as a diffusion film, a brightness enhancement film and a protection film are assembled to a light output surface of a conventional light guide plate, but these films are easily displaced during assembling or sequent transportation of a product. However, in the embodiments of the present invention, the films such as the diffusion film, the brightness enhancement film and the protection film may be placed in the groove and then the opening of the groove in the side face is sealed by an adhesive tape adhering to the side face or in any other manner, so as to prevent the films from falling off, improving assembling property of a product and avoiding a situation where the films are easily displaced during assembling or sequent transportation of the product to result in quality abnormity such as fracture of a liquid crystal panel.

In actual applications, the light guide plate may comprise various types of light guide plates, and may have various shapes. For example, the light guide plate may comprise an edge-lit light guide plate which is configured so that a luminous element (a lamp or an LED) is placed on a side of the light guide plate; and a direct-lit light guide plate which is configured so that a luminous element (a lamp or an LED) is placed under the light guide plate. In addition, the light guide plate may also be optionally cut into a required size, the light guide plates may be spliced for use, or the light guide plate may be formed into a special shape. For example, the light guide plate is formed into a shape such as a circular shape, an elliptical shape, a sectorial shape, and a triangular shape. In other words, the corresponding groove may also be formed into a special shape. Optionally, a first inner surface (an upper surface) of the groove close to the second surface of the light guide plate and a second inner surface (a lower surface) of the groove close to the first surface of the light guide plate have a circular shape, an elliptical shape, a sectorial shape, or a triangular shape.

The light guide plate for a backlight module according to the embodiments of the present invention is applicable to any types of light guide plate. In order to facilitate the description, only a common rectangular edge-lit light guide plate is taken as an example in the embodiments of the present invention.

In some implementations, in order that optical films play a role better, it is necessary to make the groove to cover the entire light guide plate as far as possible. For example, distances between the other side faces of the light guide plate and edges of the groove close to the other side faces of the light guide plate may be not greater than corresponding widths of a frame of the backlight module.

Figure 2A:
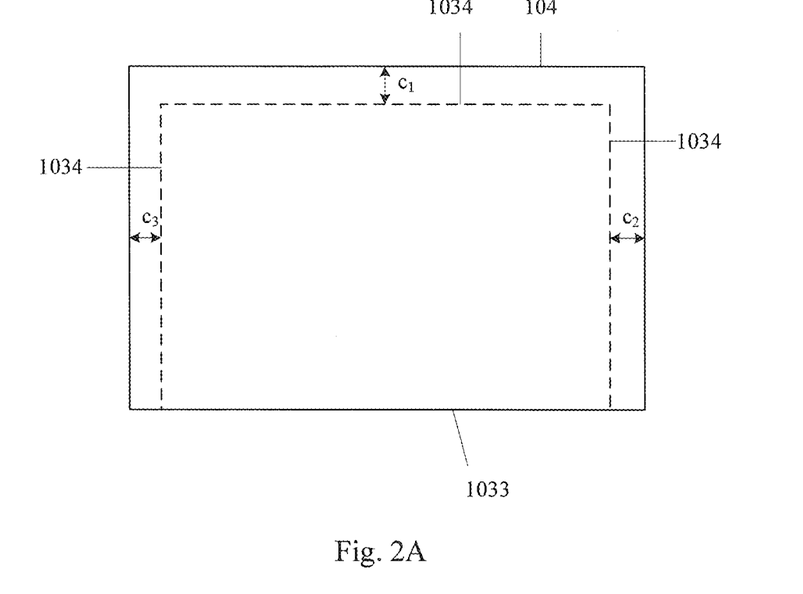
FIG. 2A is a sectional view taken along the line A-A' in FIG. 1A.

Generally, the backlight module has a packaging frame having a width, while the edges of the groove may be located in a range covered by the frame. FIG. 2A is a sectional view taken along the line A-A' in FIG. 1A. As shown in FIG. 2A, c1, c2 and c3 in FIG. 2A are distances between the other side faces 104 of the light guide plate and corresponding edges 1034 (indicated by a dashed box) of the groove close to the other side faces of the light guide plate. In some implementations, values of c1, c2 and c3 may be equal or unequal to one another. However, in order that the optical films placed in the groove play a role better, the values of c1, c2 and c3 are at least less than or equal to the corresponding widths of the frame of the backlight module to prevent the optical films from being incapable of covering a display area over the entire light guide plate due to excessively small size of the groove.

Figure 2B:
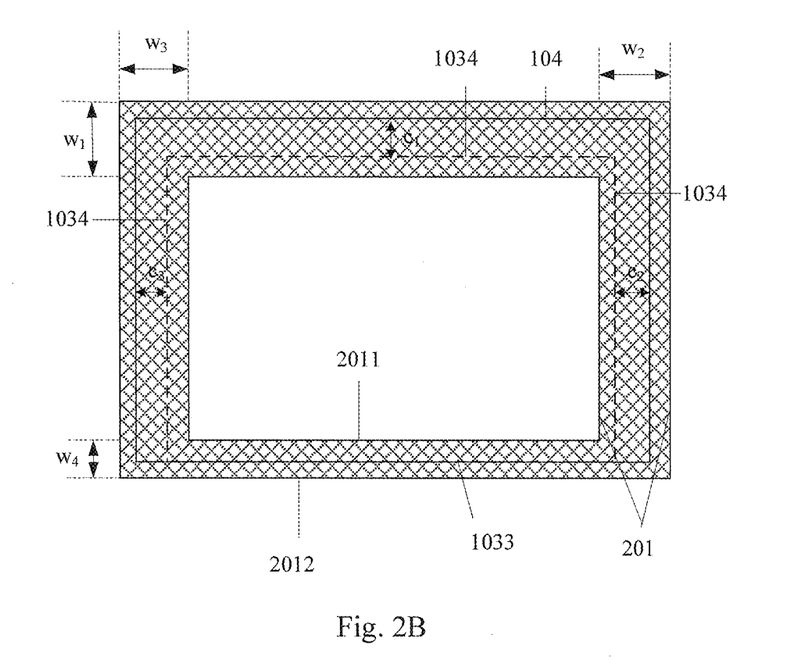
FIG. 2B is a schematic diagram showing a positional relationship between a frame and a groove according to an embodiment of the present invention.

FIG. 2B is a schematic diagram showing a positional relationship between a frame and a groove according to an embodiment of the present invention. As shown in FIG. 2B, the frame 201 indicated by the grid in FIG. 2B is a frame of the backlight module. The frame has four borders respectively having widths of w1, w2, w3, and w4. It is necessary to make the inner edge 2011 of the frame to cover the edges 1034 of the groove close to the other side faces of the light guide plate, and the edge of the opening 1033 of the groove, so that all of the edges of the groove are located in a range covered by the frame. In other words, it is necessary that a value of the distance c1 is not greater than a value of the width w1 of the corresponding border of the frame, a value of the distance c2 is not greater than a value of the width w2 of the corresponding border of the frame, a value of the distance c3 is not greater than a value of the width w3 of the corresponding border of the frame, and a value of the width w4 of the border of the frame is set such that the corresponding border of the frame can cover the edge of the opening 1033 of the groove. In FIG. 2B, the outer edge 2012 of the frame is set such that the frame covers the edge of the light guide plate. A specific size of the outer edge of the frame may be set according to actual requirements.

In some implementations, in order that the optical films play a role better, it is also necessary that the optical films in the groove are positioned as close to the second surface of the light guide plate as possible. Optionally, a distance a from the groove 103 to the second surface 102 of the light guide plate is less than a distance b from the groove 103 to the first surface 101 of the light guide plate.

As shown in FIG. 1A, when viewed from the side of the light guide plate towards the opening of the groove, the groove is positioned closer to the second surface. In other words, the distance a from the groove 103 to the second surface 102 of the light guide plate is less than the distance b from the groove 103 to the first surface 101 of the light guide plate. In some implementations, the groove 103 may also be disposed in any position of the light guide plate, but in order that the optical films play a role better, the position of the groove may be chosen to be closer to the second surface 102 side.

In some implementations, in order to reduce use of a diffusion film in the backlight module, optionally, at least one of the first inner surface 1031 of the groove close to the second surface of the light guide plate and the second inner surface 1032 of the groove close to the first surface of the light guide plate is a light diffusion surface (for example, the light diffusion surface has a concavo-convex microstructure formed by a frosting processing). For example, at least one of the first inner surface of the groove close to the second surface of the light guide plate and the second inner surface of the groove close to the first surface of the light guide plate has a concavo-convex microstructure formed thereon, so as to be formed into the light diffusion surface.

Conventional diffusion film is used for diffusing light. Therefore, in an embodiment of the present invention, the first inner surface 1031 of the groove close to the second surface of the light guide plate and the second inner surface 1032 of the groove close to the first surface of the light guide plate may be formed as diffusion surfaces, such as surfaces each having a concavo-convex microstructure, which may be formed, for example by performing a frosting processing on the first inner surface and the second inner surface. As a result, when light is irradiated onto the first inner surface 1031 of the groove close to the second surface of the light guide plate and the second inner surface 1032 of the groove close to the first surface of the light guide plate, it is diffused so that the first inner surface 1031 and the second inner surface 1032 function as diffusion films, thereby reducing use of the diffusion film. There are various specific methods of forming a surface having a concavo-convex microstructure. Some of the methods will later be explained in detail when methods of manufacturing a light guide plate are described.

In order to ensure that all of the optical films are disposed in the groove without any wrinkle, optionally, volume of the groove 103 is not less than volume of the optical films.

In some implementations, the optical films are configured to have the same shape as the groove 103 when viewed towards the second surface 102. For example, the groove 103 shown in FIG. 2A has a rectangular shape and thus the optical films contained in the backlight module also have a rectangular shape. However, in order to prevent a problem caused by thermal expansion of the optical films, the optical films may be not greater in size than the groove 103. In other words, the groove 103 at least necessarily completely contains all of the optical films. That is to say, the volume of the groove 103 is not less than a total volume of all of the optical films contained in the backlight module.

Figure 3A:
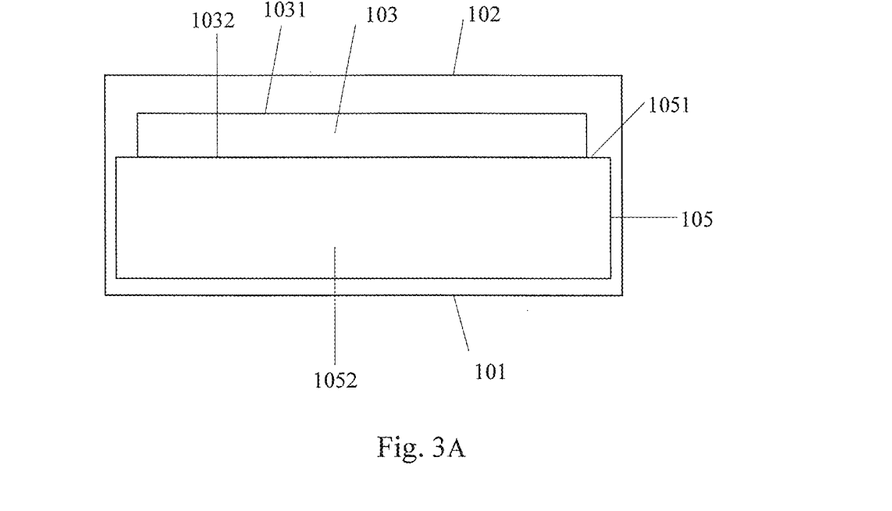
FIG. 3A is a schematic side view showing a structure of a light guide plate with a lamp recess, according to an embodiment of the present invention.

The light guide plate generally includes an edge-lit type light guide plate and a direct-lit type light guide plate. The edge-lit type light guide plate is configured so that a luminous element (a lamp or an LED) is placed on a side of the light guide plate, and a lamp recess for placing the luminous element may be formed in a side face of the light guide plate. FIG. 3A is a schematic side view showing a structure of a light guide plate with a lamp recess, according to an embodiment of the present invention. As shown in FIG. 3A, optionally, the light guide plate further comprises a lamp recess 105 formed in a side face of the light guide plate and configured for placing a backlight source.

In some implementations, a lamp recess 105 for placing a backlight source may be formed in a side face of the light guide plate, or the backlight source may also be bonded directly to the side face of the light guide plate instead of forming the lamp recess 105 in the light guide plate. If the light guide plate has a rectangular shape, the lamp recess 105 may be located in any one of the side faces of the light guide plate, and the lamp recess 105 and the groove 103 may also be located in the same side face of the light guide plate. As shown in FIG. 3A, optionally, an opening 1052 of the lamp recess and the opening 1033 of the groove are located in the same side of the light guide plate 10.

In order to facilitate mounting and removal of the films, the lamp recess and the groove may be formed without being overlapped with each other in position. Optionally, the opening 1052 of the lamp recess is positioned closer to the first surface 101 of the light guide plate than the opening 1033 of the groove. The opening 1052 of the lamp recess in the side face of the light guide plate and the opening 1033 of the groove in the side face of the light guide plate adjoin, or are separated from each other by a preset distance d.

As shown in FIG. 3A, in order that the lamp recess and the groove are not overlapped with each other in position, the opening 1052 of the lamp recess is positioned closer to the first surface 101 of the light guide plate than the opening 1033 of the groove, and the opening 1052 of the lamp recess and the opening 1033 of the groove adjoin. In other words, a first surface (an upper surface) 1051 of the lamp recess and the second inner surface 1032 of the groove close to the first surface of the light guide plate 10 share a common portion, but the lamp recess has a very less depth than the groove.

Figure 3B:
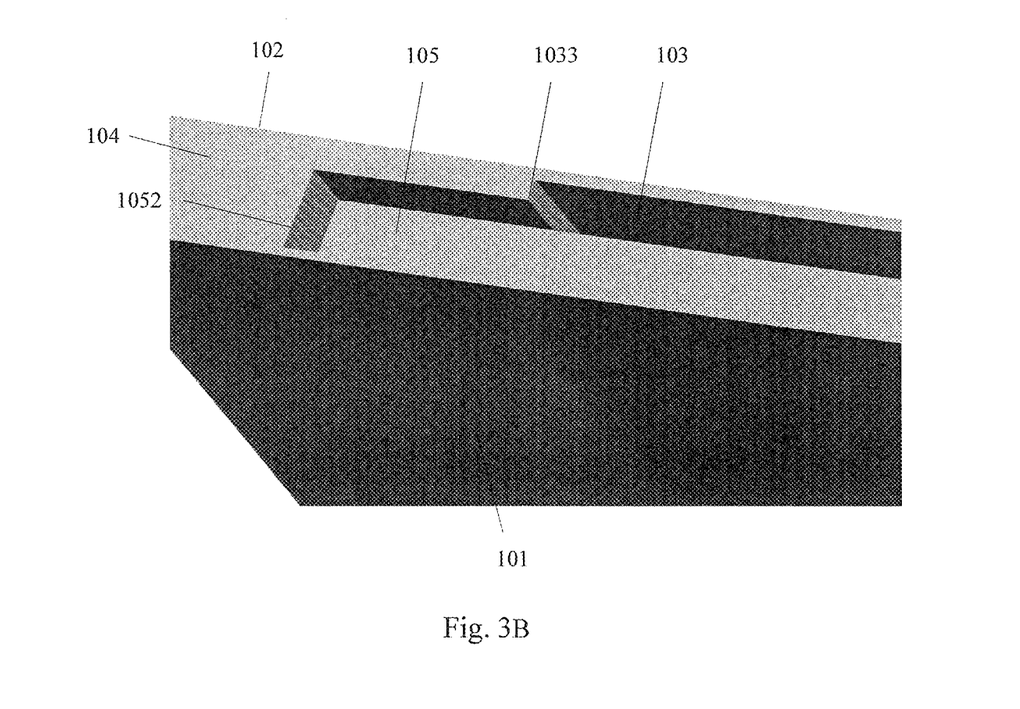
FIG. 3B is a local perspective view of the light guide plate with the lamp recess, according to the embodiment of the present invention.

In order to clearly show positions of the lamp recess 105 and the groove 103 in the light guide plate, FIG. 3B shows a local perspective view of the light guide plate with the lamp recess, according to the embodiment of the present invention. As can be seen from FIG. 3B, the opening 1052 of the lamp recess and the opening 1033 of the groove are located in the same side face 104 of the light guide plate 10, and the opening 1052 of the lamp recess and the opening 1033 of the groove adjoin. In some implementations, the lamp recess 105 is positioned closer to the first surface 101 of the light guide plate than the groove 103, or the groove 105 may be positioned closer to the first surface 101 of the light guide plate than the lamp recess 103 according to actual requirements. In other words, the groove 103 and the lamp recess 105 shown in the figures are transposed so that the groove 103 is closer to the first surface 101 of the light guide plate than the lamp recess 105.

Figure 3C:
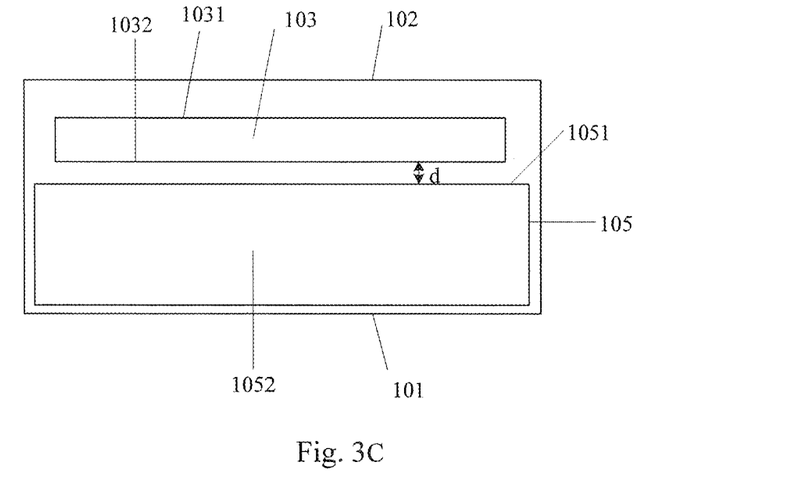
FIG. 3C is a schematic side view showing a structure of another light guide plate with a lamp recess, according to an embodiment of the present invention.

In some implementations, in addition to the situation where the opening 1052 of the lamp recess and the opening 1033 of the groove adjoin as shown in FIGS. 3A and 3B, the opening 1052 of the lamp recess in the side face of the light guide plate and the opening 1033 of the groove in the side face of the light guide plate may be disposed to be separated from each other by a preset distance d. FIG. 3C is a schematic side view showing a structure of another light guide plate with a lamp recess according to an embodiment of the present invention. As shown in FIG. 3C, in order to ensure that the lamp recess and the groove are not overlapped with each other, there may be a distance d between the lamp recess 105 and the groove 103. In other words, there is the distance d between the first surface (the upper surface) 1051 of the lamp recess and the second inner surface 1032 of the groove close to the first surface of the light guide plate 10. Thereby, after the backlight source is mounted into the lamp recess 105, the backlight source will not hinder the optical films from being mounted into the groove 103, to facilitate mounting and removal of the films.

In some implementations, the optical films that may be disposed in the groove 103 may comprise any types of optical films that would otherwise be disposed on a surface of the light guide plate. Optionally, the optical films comprise one or more of a brightness enhancement film for condensing light to enhance brightness, a protection film for preventing the brightness enhancement film from being scratched, and a diffusion film for diffusing light.

In other words, an optical film, such as a brightness enhancement film, a protection film, a diffusion film and the like, to be disposed in the groove 103 may be optionally selected according to requirements in actual manufacture of a display apparatus. However, in the embodiment of the present invention, the first inner surface 1031 of the groove close to the second surface of the light guide plate and the second inner surface 1032 of the groove close to the first surface of the light guide plate are disposed as light diffusion surfaces. Therefore, use of the diffusion film can be reduced. In other words, the groove 103 may be provided with no diffusion film therein according to actual requirements.

Based on the same inventive concept, embodiments of the present invention further provide a backlight module comprising the light guide plate according to any one of the embodiments of the present invention, and also provide a display apparatus comprising the backlight module according to any one of the embodiments of the present invention. Since principles of the backlight module and the display apparatus for solving a problem are similar to those of the light guide plate according to the embodiments of the present invention, the implementations of the light guide plate may be referred to for implementations of the backlight module and the display apparatus and repeated contents are no longer described for the sake of brevity.

Figure 4:
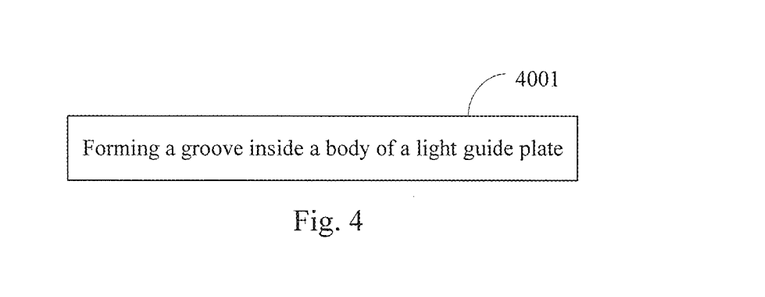
FIG. 4 is a flow diagram showing a method of manufacturing a light guide plate for backlight module, according to an embodiment of the present invention.

FIG. 4 is a flow diagram showing a method of manufacturing a light guide plate for backlight module according to a further embodiment of the present invention. As shown in FIG. 4, the method of manufacturing a light guide plate for a backlight module according to the embodiment of the present invention comprises:

a step 4001 of forming a groove inside the body of the light guide plate.

The groove is configured to accommodate an optical film and has the opening located in the side face of the light guide plate.

In other words, the method of manufacturing a light guide plate for backlight module according to the embodiment of the present invention is mainly used for forming the groove having the opening that is located in the side face of the light guide plate, inside the body of the light guide plate, thereby manufacturing the light guide plate having the groove. There may be two main detailed manufacturing methods. They will be specifically explained hereafter.

The first manufacturing method, i.e., an injection molding method, will be described as follows.

Figure 5A:
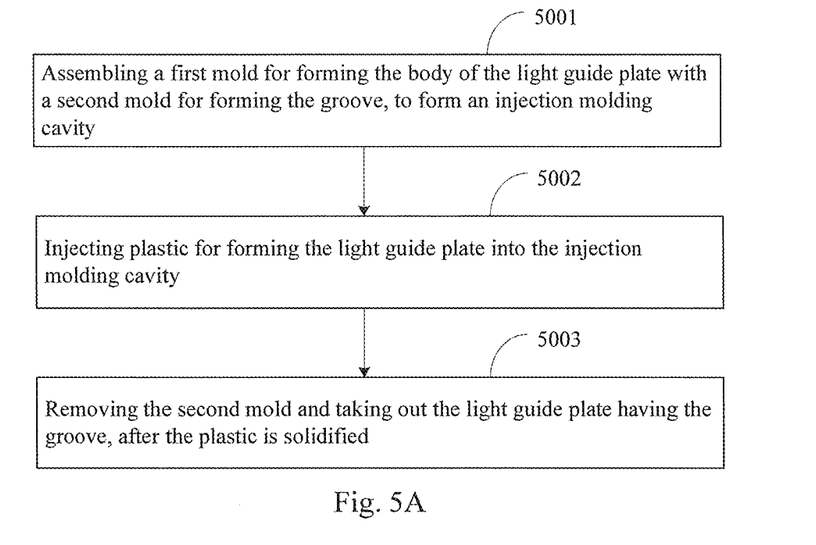
FIG. 5A is a whole flow diagram showing a method of manufacturing a light guide plate by injection molding, according to an embodiment of the present invention.

FIG. 5A is a whole flow diagram showing a method of manufacturing a light guide plate by injection molding, according to an embodiment of the present invention. As shown in FIG. 5A, optionally, the step 4001 specifically comprises:

a step 5001 of assembling a first mold for forming the body of the light guide plate, with a second mold for forming the groove, to form an injection molding cavity;

a step 5002 of injecting plastic for forming the light guide plate into the injection molding cavity; and a step 5003 of removing the second mold and taking out the light guide plate having the groove, after the plastic is solidified.

Figure 5B:
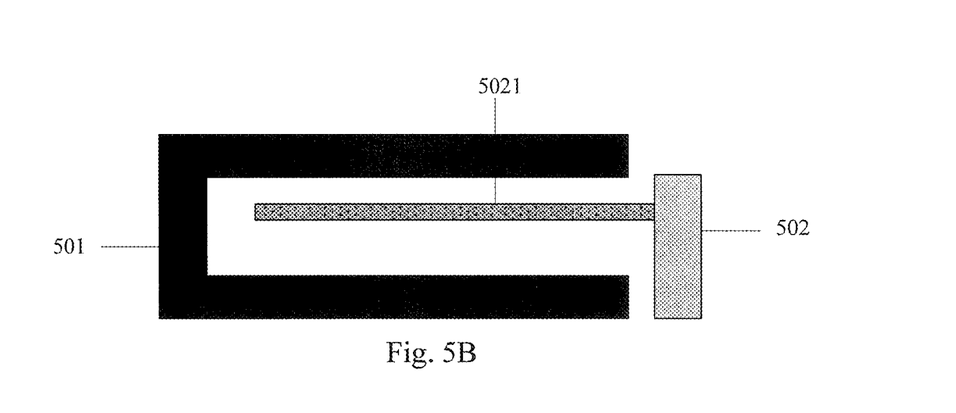
FIG. 5B is a sectional view of an injection mold, which is taken along a plane perpendicular to the side face of the light guide plate where an opening of the groove is located, according to the embodiment of the present invention.
Figure 5C:
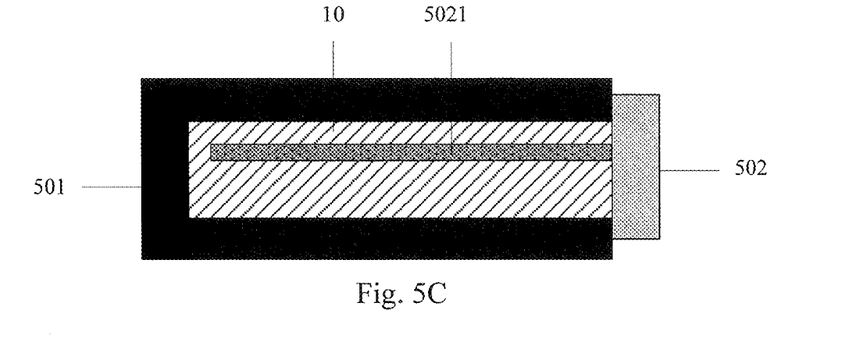
FIG. 5C is a sectional view of the injection mold during an injection molding, which is taken along a plane perpendicular to the side of the light guide plate where the opening of the groove is located, according to the embodiment of the present invention.
Figure 5D:
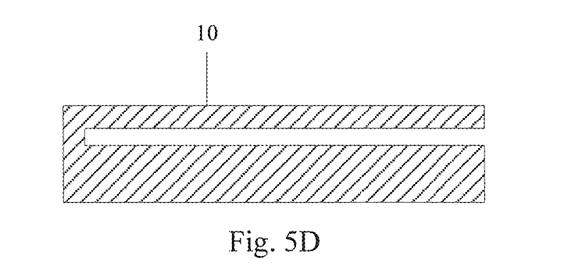
FIG. 5D is a sectional view of the light guide plate after an injection molding, which is taken along a plane perpendicular to the side of the light guide plate where the opening of the groove is located, according to the embodiment of the present invention.

FIG. 5B is a sectional view of an injection mold, which is taken along a plane perpendicular to the side face of the light guide plate where an opening of the groove is located, according to an embodiment of the present invention. FIG. 5B is also the sectional view which is taken along the plane perpendicular to the side face of the light guide plate where the opening of the groove is located. In FIG. 5B, the injection mold mainly comprises two parts, i.e., a first mold 501 and a second mold 502. The second mold comprises a steel plate 5021 or any other appropriate plate. FIG. 5C is a sectional view of the injection mold during an injection molding, which is taken along a plane perpendicular to the side of the light guide plate where the opening of the groove is located, according to the embodiment of the present invention. The plane in FIG. 5C is the same as that in the FIG. 5B. As shown in FIG. 5C, plastic is injected into an injection molding cavity formed by assembling the first mold 501 with the second mold 502. Since the second mold comprises the steel plate 5021 for forming the groove, after the plastic is solidified, the second mold 502 is removed. Thereby, the molded light guide plate has the groove therein. FIG. 5D is a sectional view of the light guide plate after an injection molding, which is taken along a plane perpendicular to the side of the light guide plate where the opening of the groove is located, according to an embodiment of the present invention. The plane in FIG. 5D is the same as that in the FIG. 5B. As shown in FIG. 5D, the sectional view is a sectional view of the light guide plate 10 taken out after injection molding, which is taken along the plane perpendicular to the side of the light guide plate where the opening of the groove is located.

In order that the first inner surface and the second inner surface of the groove are formed as light diffusion surfaces, optionally, the second mold is provided with the steel plate 5021 and the steel plate 5021 has a first surface and a second surface each having a surface structure, such as a concavo-convex microstructure, for forming a light diffusion surface. In other words, in the injection mold as shown in FIG. 5B, the first surface (an upper surface) and the second surface (a lower surface) of the steel plate 5021 of the second mold each have the surface structure, such as the concavo-convex microstructure, for forming the light diffusion surface. Therefore, each of the first inner surface and the second inner surface of the groove formed by the steel plate 5021 also correspondingly has a surface structure such as a concavo-convex microstructure.

The method according to the embodiments of the present invention can be very easily achieved by those skilled in the art by following the steps described in the embodiments in combination with an injection molding process for a conventional light guide plate. Main injection molding parameters are as follows.

Optionally, an injection speed for injecting plastic is in the range of 6 mm/sec-800 mm/sec, a mold temperature for molding the light guide plate is in the range of 75 □-95 □, a melt temperature is in the range of 260 □-280 □, a dwell pressure for molding the light guide plate is 80% of an injection pressure, a dwell time for molding the light guide plate is in the range of 1 s-20 s, and a cooling time is 2 s. For example, the injection speed for injecting plastic is 100 mm/sec, the mold temperature for molding the light guide plate is 90 □, the melt temperature is 270 □, and the dwell time for molding the light guide plate is 3 s.

In some implementations, if the injection speed for injecting plastic is too high, pressure loss will be increased. In this embodiment, an appropriate injection speed for injecting plastic is in the range of 6 mm/sec~800 mm/sec, for example 100 mm/sec. The mold temperature will affect molding cycle and molding quality. In actual operations, the mold temperature is set starting at a lowest appropriate mold temperature for material for a product and then is suitably adjusted up according to quality of the product. In this embodiment, the appropriate mold temperature for molding the light guide plate is in the range of 75 □-95 □, for example, 90 □. A melt temperature suitable for the injection molding method according to the embodiment of the present invention is in the range of 260 □-280 □, for example 270 □.

A high dwell pressure can improve a density of a plastic product, alleviate or eliminate sink mark of the plastic product, and prevent phenomena such as backflow of melt plastic. However, the high dwell pressure will also bring about some adverse influences such as strong orientation of a product, increased cooling time, and unfavourable demoulding. In this embodiment, appropriate dwell pressure for molding the light guide plate is 80% of an injection pressure. The injection pressure relates to many factors such as a type of plastic for forming a product by injection molding, a structure and a form of a nozzle, and a size of a gate of the mold. Generally, the injection pressure is 40-200 MPa. During an injection molding, appropriate dwell time helps to reduce shrink of a product, but excessively long dwell time will increase internal stress of a product sharply. In this embodiment, the dwell time for molding the light guide plate is 1 s-20 s, for example, 3 s. The longer the injection molding cooling time is, the longer the injection molding cycle is and the more the cost is. However, if the cooling time is excessively short, poor injection molding situations such as deformation of a product will occur. In this embodiment, the cooling time is 2 s.

The second manufacturing method, i.e., a cutting method, will be described as follows.

Figure 6A:
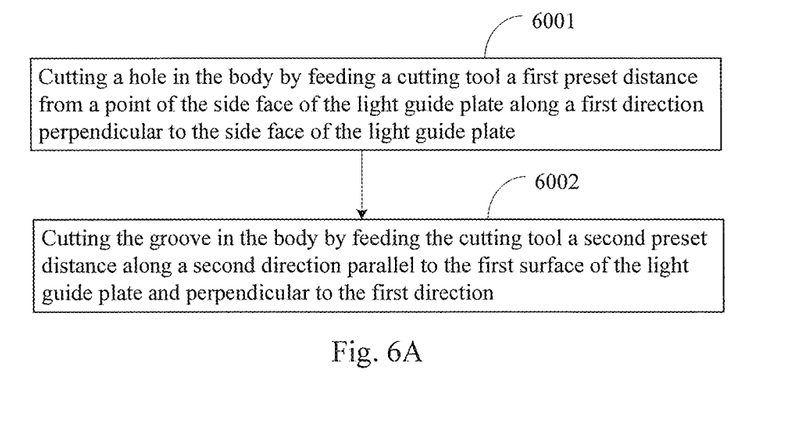
FIG. 6A is a whole flow diagram showing a method of manufacturing a light guide plate having a groove by cutting a solid light guide plate with a cutting tool, according to an embodiment of the present invention.

In some implementations, a light guide plate having a groove may be manufactured by cutting a solid light guide plate with a cutting tool, which is equivalent to cutting a rectangular groove in a side face of the light guide plate with the cutting tool. FIG. 6A is a whole flow diagram showing a method of manufacturing a light guide plate having a groove by cutting a solid light guide plate with a cutting tool, according to an embodiment of the present invention. As shown in FIG. 6A, optionally, the step 4001 specifically comprises:

a step 6001 of cutting a hole in the body by feeding a cutting tool a first preset distance from a point of the side face of the light guide plate along a first direction perpendicular to the side face of the light guide plate; and a step 6002 of cutting the groove in the body by feeding the cutting tool a second preset distance along a second direction parallel to the first surface of the light guide plate and perpendicular to the first direction.

Figure 6B:
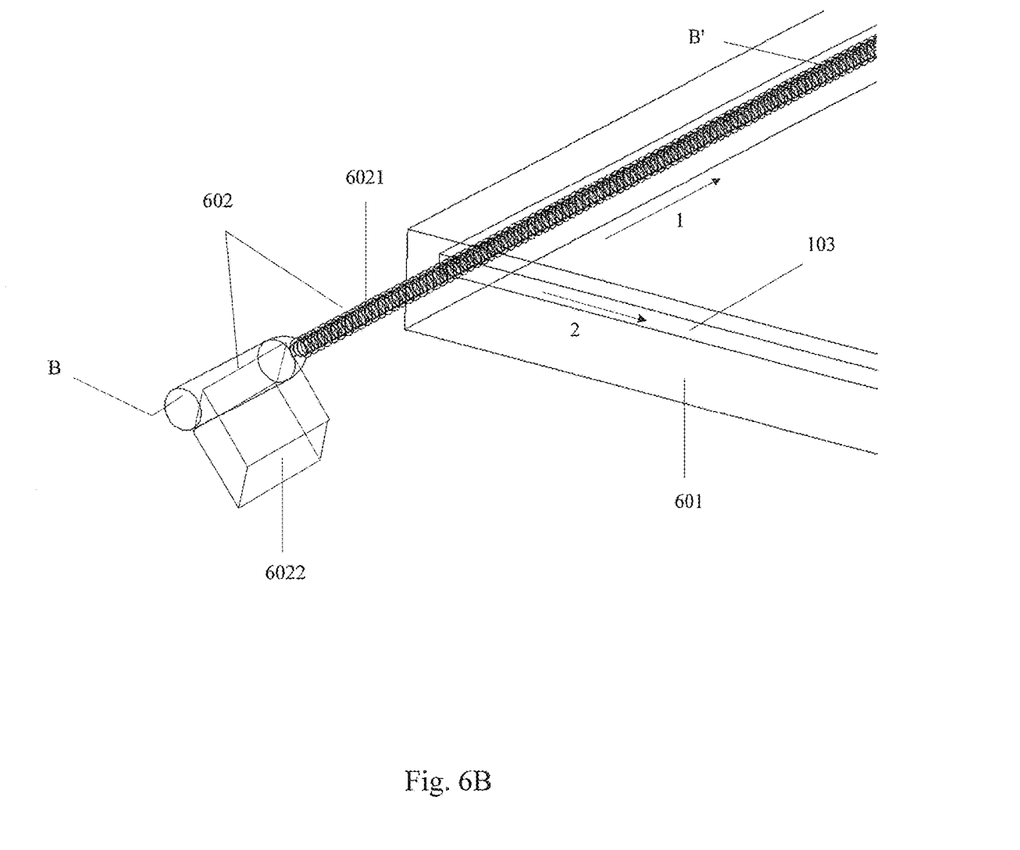
FIG. 6B is a local perspective view showing a light guide plate being cut with a cutting tool, according to an embodiment of the present invention.

In order to show the two cutting processes more clearly, FIG. 6B shows a local perspective view of a light guide plate being cut with a cutting tool, according to an embodiment of the present invention. In FIG. 6B, 601 denotes a light guide plate to be cut, 602 denotes a cutting tool mainly comprising a tool bit 6021 and a vacuum cleaner 6022 for collecting swarf generated during the cutting, 103 denotes the groove formed after the two cuttings, and arrow 1 and arrow 2 denote the first and second directions of the two cuttings, respectively. Firstly a hole is cut in the body by feeding a cutting tool 602 a first preset distance along a first direction indicated by the arrow 1 (i.e., a direction perpendicular to the side face of the light guide plate); and then the groove is cut in the body by feeding the cutting tool 602 a second preset distance along a second direction indicated by the arrow 2 (i.e., a direction parallel to the first surface of the light guide plate and perpendicular to the first direction).

A clamping fixture 603 for fixing the light guide plate is not shown in FIG. 6B. In some implementations, the clamping fixture 603 mainly functions to prevent displacement of the light guide plate during the cutting. A specific position where the light guide plate is clamped is not limited. FIG. 6B shows the vacuum cleaner 6022 being disposed on a side of a top of the cutting tool. In some implementations, however, a specific position of the vacuum cleaner 6022 is not limited so long as the vacuum cleaner does not adversely affect the cutting process and is able to collect swarf generated during the cutting. In addition, the tool bit 6021 and the vacuum cleaner 6022 may also be separated from each other according to requirements.

Figure 6C:
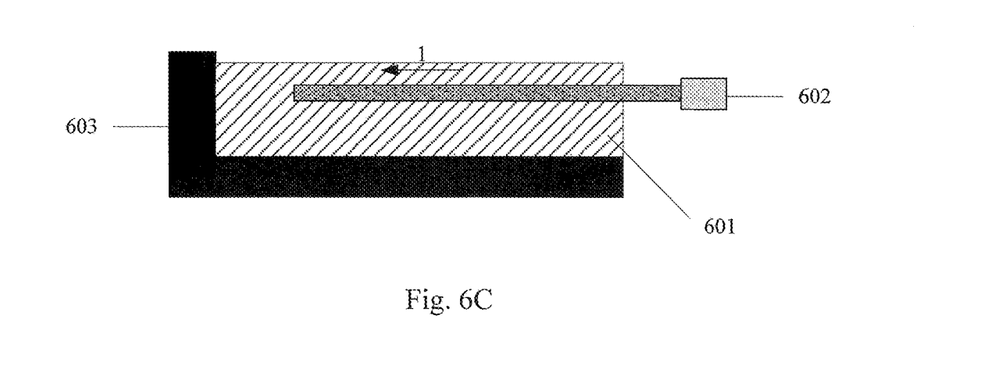
FIG. 6C is a sectional view taken along the line B-B' in FIG. 6B.

FIG. 6C is a sectional view taken along the line B-B' in FIG. 6B. As shown in FIG. 6C, a light guide plate 601 to be cut, a cutting tool 602, and a clamping fixture 603 for fixing the light guide plate are mainly shown. In the step 6001, the hole is cut in the body by feeding the cutting tool the first preset distance from any point of any side face (a narrower surface) of the light guide plate in a depth direction (i.e., the direction perpendicular to the side of the light guide plate) along the first direction indicated by the arrow 1 shown in FIG. 6B. The first preset distance is set such that it is at least ensured that the cutting tool will not pass through the light guide plate.

Figure 6D:
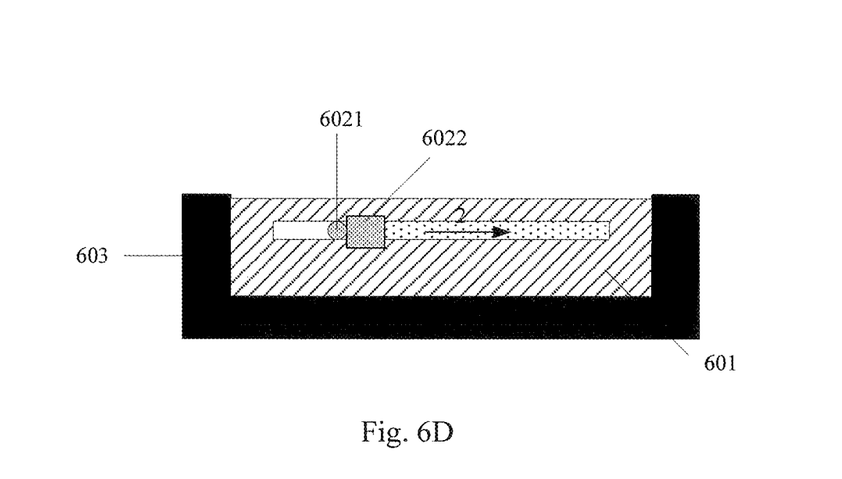
FIG. 6D is a side view showing the light guide plate being cut with the cutting tool as shown in FIG. 6B, according to the embodiment of the present invention.

FIG. 6D is a side view showing the light guide plate being cut with the cutting tool as shown in FIG. 6B, according to the embodiment of the present invention. In the step 6002, after the hole is cut in the body in the depth direction, the groove 103 is cut in the body by feeding the cutting tool 602 the second preset distance in a horizontal direction (i.e., a direction parallel to the first surface of the light guide plate)

along the second direction indicated by the arrow 2 shown in FIG. 6B. The second preset distance is also set such that it is at least ensured that the cutting tool will not pass through the light guide plate. The groove 103 may be formed inside the body of the light guide plate by the two cuttings.

Since the first inner surface and the second inner surface of the groove according to the embodiment of the present invention each has a concavo-convex microstructure, a cutting tool (such as a polishing cutter) of which a tool bit has a relatively rough surface is needed to cut the groove of the light guide plate. Optionally, a surface of the cutting tool 602 has a rough structure so that a concavo-convex microstructure is formed on each of the first inner surface and the second inner surface of the groove 103 during the cutting.

As shown in FIG. 6B, a tool bit 6021 of the cutting tool shown in FIG. 6B has a surface in a screw thread-like rough structure. When the groove of the light guide plate is cut with the cutting tool, a concavo-convex microstructure is formed on each of the first inner surface and the second inner surface of the cut groove. In some implementations, it may be regarded as a frosting processing to form a concavo-convex microstructure on each of the first inner surface and the second inner surface of the groove. In other words, with the cutting method according to the embodiment of the present invention, a frosting processing may be performed on the surfaces of the groove while the groove is formed. For example, the groove according to the embodiment may be cut in the light guide plate by using a polishing cutter, of which a tool bit has a rough surface, as the cutting tool. The first inner surface and the second inner surface of the groove which are cut each has a concavo-convex microstructure. In other words, a frosting processing is performed on the surfaces of the groove while the groove is cut in the light guide plate. In some implementations, different polishing cutters may be selected according to different requirements for a frosting degree.

The method according to the embodiments of the present invention can be very easily achieved by those skilled in the art by following the steps described in the embodiments in combination with a conventional cutting technology. A rotational speed of the cutting tool during the cutting may be selected as follows.

Optionally, the rotational speed of the cutting tool during the cutting is in a range of 18000-24000 rpm. For example, the rotational speed of the cutting tool during the cutting is 22000 rpm.

In sum, in these embodiments, a groove configured to accommodate the optical film is formed inside the light guide plate, and an opening of the groove is located in the side face of the light guide plate. Therefore, the optical films included in the backlight module may be placed in the groove, thereby improving assembling property of a product and avoiding a situation where the films are easily displaced during assembling or sequent transportation of the product to result in quality abnormity such as fracture of a liquid crystal panel.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:

1. A light guide plate for a backlight module, comprising:
a body comprising: a first surface; a second surface which is opposite to the first surface and serves as a light output surface; and a side face; and
a groove formed inside the body and having an opening located in the side face, wherein the groove is configured to accommodate an optical film,
wherein a distance from the groove to the second surface of the light guide plate is less than a distance from the groove to the first surface of the light guide plate.

2. A light guide plate for a backlight module, comprising:
a body comprising: a first surface; a second surface which is opposite to the first surface and serves as a light output surface; and a side face; and
a groove formed inside the body and having an opening located in the side face, wherein the groove is configured to accommodate an optical film,
wherein at least one of a first inner surface of the groove close to the second surface of the light guide plate and a second inner surface of the groove close to the first surface of the light guide plate comprises a light diffusion surface.

3. The light guide plate of claim 1, wherein:
a volume of the groove is not less than a volume of the optical film.

4. A light guide plate for a backlight module, comprising:
a body comprising: a first surface; a second surface which is opposite to the first surface and serves as a light output surface; and a side face;
a groove formed inside the body and having an opening located in the side face, wherein the groove is configured to accommodate an optical film; and
a lamp recess formed in the side face and configured for placing a backlight source,
wherein an opening of the lamp recess and the opening of the groove are located in the same side face of the light guide plate.

5. The light guide plate of claim 4, wherein:
the opening of the lamp recess is positioned closer to the first surface of the light guide plate than the opening of the groove.

6. The light guide plate of claim 5, wherein:
the opening of the lamp recess in the side face adjoins, or is separated by a preset distance from the opening of the groove in the side face.

7. The light guide plate of claim 1, wherein:
the optical film comprises one or more of:
a brightness enhancement film for condensing light to enhance brightness, a protection film for preventing the brightness enhancement film from being scratched, and a diffusion film for diffusing light.

8. The light guide plate of claim 1, wherein:
a first inner surface of the groove close to the second surface of the light guide plate and a second inner surface of the groove close to the first surface of the light guide plate have a rectangular shape, a circular shape, an elliptical shape, a sectorial shape, or a triangular shape.

9. The light guide plate of claim 1, wherein:
the first surface comprises a light diffusion surface.

10. The light guide plate of claim 2, wherein:
at least one of the first inner surface of the groove close to the second surface of the light guide plate and the second inner surface of the groove close to the first surface of the light guide plate has a concavo-convex microstructure formed thereon, so as to be formed into a light diffusion surface.

11. The light guide plate of claim 9, wherein:
the first surface has a concavo-convex microstructure formed thereon, so as to be formed into a light diffusion surface.

12. A backlight module comprising:
a light guide plate according to claim 1.

13. A display apparatus comprising:
a backlight module according to claim 12.

14. A method of manufacturing a light guide plate according to claim 1, the method comprising:
forming the groove inside the body, wherein the groove is configured to accommodate an optical film and has the opening located in the side face.

15. The method of claim 14, wherein:
the forming the groove comprises:
assembling a first mold for forming the body of the light guide plate, with a second mold for forming the groove, to form an injection molding cavity;
injecting plastic for forming the light guide plate into the injection molding cavity; and
removing the second mold and taking out the light guide plate having the groove, after the plastic is solidified.

16. The method of claim 15, wherein:
at least one of a first inner surface of the groove of the light guide plate close to the second surface of the light guide plate and a second inner surface of the groove close to the first surface of the light guide plate comprises a light diffusion surface, and
the second mold is provided with a plate and the plate has a surface having a surface structure for forming a light diffusion surface.

17. The method of claim 14, wherein:
the forming the groove comprises:
cutting a hole in the body by feeding a cutting tool a first preset distance from a point of the side face of the light guide plate along a first direction perpendicular to the side face of the light guide plate; and
cutting the groove in the body by feeding the cutting tool a second preset distance along a second direction parallel to the first surface of the light guide plate and perpendicular to the first direction.

18. The method of claim 17, wherein:
at least one of a first inner surface of the groove of the light guide plate close to the second surface of the light guide plate and a second inner surface of the groove close to the first surface of the light guide plate comprises a light diffusion surface, and
a surface of the cutting tool has a rough structure so that the at least one of the first inner surface and the second inner surface of the groove is formed into a light diffusion surface during the cutting.

19. A backlight module comprising:
a light guide plate according to claim 2.

20. A backlight module comprising:
a light guide plate according to claim 4.

* * * * *